US009374708B2

(12) United States Patent
Ji

(10) Patent No.: US 9,374,708 B2
(45) Date of Patent: Jun. 21, 2016

(54) METHOD AND SYSTEM FOR ENCRYPTING TERMINAL USING SUBSCRIBER IDENTITY MODULE CARD

(71) Applicant: ZTE CORPORATION, Shenzhen, Guangdong Province (CN)

(72) Inventor: Junfeng Ji, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/414,901

(22) PCT Filed: Jul. 29, 2013

(86) PCT No.: PCT/CN2013/080287
§ 371 (c)(1),
(2) Date: Jan. 15, 2015

(87) PCT Pub. No.: WO2013/185701
PCT Pub. Date: Dec. 19, 2013

(65) Prior Publication Data
US 2015/0181423 A1 Jun. 25, 2015

(30) Foreign Application Priority Data

Aug. 17, 2012 (CN) .......................... 2012 1 0293559

(51) Int. Cl.
H04W 12/06 (2009.01)
H04W 12/02 (2009.01)
(52) U.S. Cl.
CPC .............. H04W 12/06 (2013.01); H04W 12/02 (2013.01)
(58) Field of Classification Search
CPC ....... H04W 12/06; H04W 12/02; H04W 8/18; H04W 12/04; H04W 48/20; H04W 4/02; H04W 72/04; H04W 76/02; H04W 76/021; H04W 76/025; H04W 84/10; H04W 12/08; H04W 48/08; H04W 8/20; H04L 9/32; H04L 9/03

See application file for complete search history.

(56) References Cited

U.S. PATENT DOCUMENTS 8,233,901 B2    7/2012  Lee
8,621,036 B1 * 12/2013  L'Heureux ............. G06F 21/62
                                                709/217

(Continued)

FOREIGN PATENT DOCUMENTS

CN    101287193 A    10/2008
CN    101287211 A    10/2008

(Continued)

Primary Examiner — Hirdepal Singh
(74) Attorney, Agent, or Firm — Ling Wu; Stephen Yang; Ling and Yang Intellectual Property

(57) ABSTRACT

A method for encrypting a terminal with a subscriber identity card includes: a terminal storing the unique identity number of a subscriber identity card; the terminal detecting an operation of a user and authenticating a current user according to authentication conditions set by the user. Authenticating the current subscriber refers to that the terminal reads the unique identity number of the current subscriber identity card, and compares the read unique identity number of current subscriber identity card with the stored unique identity number of subscriber identity card; if they are the same, the terminal is controlled to enter a normal working state; and if they are different, the terminal locks by itself or disables the access of current user. The present document encrypts a mobile terminal with a subscriber identity card, so as to make the encryption technique of the terminal more secure and reliable, and improve the user experience.

12 Claims, 3 Drawing Sheets

(56) References Cited

U.S. PATENT DOCUMENTS

| | | | |
|---|---|---|---|
| 9,002,018 B2* | 4/2015 | Wilkins | H04L 9/006 380/281 |
| 9,078,130 B2* | 7/2015 | Palanigounder | H04L 12/1868 |
| 2006/0009214 A1 | 1/2006 | Cardina et al. | |
| 2007/0082705 A1 | 4/2007 | Jain et al. | |
| 2009/0094681 A1* | 4/2009 | Sadler | G06F 21/32 726/4 |
| 2009/0325641 A1 | 12/2009 | Lee et al. | |
| 2010/0273452 A1* | 10/2010 | Rajann | H04W 8/22 455/411 |
| 2013/0042295 A1* | 2/2013 | Kelly | G06F 21/53 726/1 |
| 2013/0205380 A1* | 8/2013 | Avni | H04L 63/0853 726/7 |
| 2013/0254543 A1* | 9/2013 | Frank | H04L 63/0853 713/168 |

FOREIGN PATENT DOCUMENTS

| | | |
|---|---|---|
| CN | 101420697 A | 4/2009 |
| CN | 101790161 A | 7/2010 |
| CN | 101969493 A | 2/2011 |

* cited by examiner

METHOD AND SYSTEM FOR ENCRYPTING TERMINAL USING SUBSCRIBER IDENTITY MODULE CARD

TECHNICAL FIELD

The present document relates to a terminal encryption technology, and more particularly, to a method and system for encrypting a terminal with a subscriber identity card.

BACKGROUND OF THE INVENTION

With the development of mobile terminal technology, there are more and more people using mobile terminals, and there are higher and higher requirements put forward on the mobile terminal encryption technology, for example, the following situation may be encountered when using a terminal: the user cannot take the terminal with himself or herself anytime and anywhere, especially when the terminal is a relatively large tablet, and when the user leaves the terminal, the terminal may be lost or the private data may be leaked out, or the terminal stores data or files which we do not want others to look at, therefore the user may need to encrypt the terminal, particularly encrypt the hardware, and the subscriber identity card (such as SIM card, USIM card and so on) is the hardware device essential for each terminal whose card can be separated, and for the terminal, the subscriber identity card can be easily plugged in and plugged out, and the plug-in and plug-out of the subscriber identity card is very easy especially for the tablet. However, currently there exists no technology to encrypt the terminal with the subscriber identity card in the related art.

SUMMARY OF THE INVENTION

To address the abovementioned problem, the objective of the present document is to provide a method and system for encrypting a terminal with a subscriber identity card, so as to use the subscriber identity card to encrypt the terminal, and the specific technical scheme is as follows:

a method for encrypting a terminal with a subscriber identity card comprises:

the terminal storing a unique identity number of the subscriber identity card; and the terminal detecting operations of a user and authenticating a current user according to authentication conditions set by the user, wherein said authenticating the current user refers to that the terminal reads a unique identity number of a current subscriber identity card, and compares the read unique identity number of the current subscriber identity card with the stored unique identity number of the subscriber identity card, if they are the same, the terminal entering into a normal working state, and if they are not the same, the terminal locking itself or disabling access of the current user.

The authentication conditions set by the user comprise: when detecting that a booting operation of the current user, authenticating the current user.

The authentication conditions set by the user comprise: when the current user accesses encrypted data and/or files and/or folders and/or virtual storage space set by the user, authenticating the current user.

The authentication conditions set by the user comprise: authenticating the current user according to authentication time or time interval set by the user.

The method further comprises: after the terminal locks itself or disables the access of the current user, reporting location information of the terminal to a mobile communication network server.

The method further comprises: after the terminal locks itself or disables the current user to access the terminal, deleting the encrypted data and/or files and/or folders and/or virtual storage space set by the user.

The present document further provides another method for encrypting a terminal with a subscriber identity card, comprising:

the terminal storing a unique identity number of the subscriber identity card;

a mobile communication network server storing a unique identity number of the terminal and the unique identity number of the subscriber identity card;

the mobile communication network server sending the terminal an authentication request via the subscriber identity card; and according to the authentication request sent by the mobile communication network server, the terminal authenticates a current user, comprising: the terminal reading a unique identity number of a current subscriber identity card, and comparing the read unique identity number of the current subscriber identity card with the stored unique identity number of the subscriber identity card, if they are the same, then the terminal entering into a normal working state, if they are not the same, the terminal locking itself or disabling the current user to access the terminal.

The method further comprises: after the terminal locks itself or disables the current user to access the terminal, reporting location information of the terminal to the mobile communication network server.

The method further comprises: after the terminal locks itself or disables the current user to access the terminal, deleting encrypted data and/or files and/or folders and/or virtual storage space set by the user.

The present document further provides a system for encrypting a terminal with a subscriber identity card, comprising:

a storing module, which is provided in the terminal and configured to store a unique identity number of the subscriber identity card;

an authenticating module, which is provided in the terminal and configured to detect operations of a user, as well as authenticate a current user according to authentication conditions set by the user through following ways: reading a unique identity number of a current subscriber identity card, and comparing the read unique identity number of the current subscriber identity card with the unique identity number of the subscriber identity card stored in the storing module; and a controlling module, which is provided in the terminal and configured to lock the terminal or disable access of the current user according to an authentication result of the authenticating module.

The authentication conditions set by user comprise: when detecting a booting operation of the current user, authenticate the current user.

The authentication conditions set by the user comprise: when the current user accesses encrypted data and/or files and/or folders and/or virtual storage space set by the user, authenticating the current user.

The authentication conditions set by the user comprise: authenticating the current user according to authentication time or time interval set by the user.

The system further comprises a location reporting module, which is provided in the terminal and configured to: after the terminal locks itself or disables the current user to access the terminal, report location information of the terminal to the mobile communication network server.

The system further comprises a deleting module, which is provided in the terminal and configured to, after the terminal locks itself or disables the current user to access the terminal, delete the encrypted data and/or files and/or folders and/or virtual storage space set by the user.

The present document further provides another system for encrypting a terminal with a subscriber identity card, comprising:

a storing module, which is provided in the terminal and configured to store a unique identity number of the subscriber identity card;

an identity storing module, which is provided in the mobile network server and configured to store the unique identity numbers of the subscriber identity card and a unique identity number of the terminal;

an authentication requesting module, which is provided in the mobile network server and configured to send an authentication request to the terminal through the subscriber identity card;

an authenticating module, which is provided in the terminal and configured to authenticate a current user according to the authentication request sent by the mobile communication network server in a following way: reading the unique identity number of the current subscriber identity card, and comparing the read unique identity number of the current subscriber identity card with the unique identity number of the subscriber identity card stored in the storing module; and a controlling module, which is provided in the terminal and configured to lock the terminal or disable the user to access the terminal according to an authentication result of the authenticating module.

The system further comprises a location reporting module, which is provided in the terminal and configured to: after the terminal is locked or the current user is disabled to access the terminal, report location information of the terminal to the mobile communication network server.

The system further comprises a deleting module, which is provided in the terminal and provided to: after the terminal is locked or the current user is disabled to access the terminal, delete encrypted data and/or files and/or folders and/or virtual storage space set by the user.

The present document uses the subscriber identity card to encrypt the mobile terminal, so as to make the encryption technology of terminal more secure and reliable, and to improve the user experience.

BRIEF DESCRIPTION OF THE DRAWINGS

The accompanying drawings are used to provide a further understanding of the present document and constitute a part of this specification, and with the drawings and the embodiments of the present document are used to explain the present document, and they are not construed as limiting the present document. In the accompanying drawings.

PREFERRED EMBODIMENTS OF THE PRESENT DOCUMENT

Hereinafter in conjunction with the accompanying drawings, the preferred embodiments of the present document will be described, and it should be understood that the preferred embodiments described herein are only intended to illustrate and explain the present document and are not intended to limit the present document.

The core idea of the present document is as follows: encrypting the terminal with the subscriber identity card, especially using the unique identity number of the subscriber identity card to encrypt the terminal, the user stores the unique identity number of the subscriber identity card in the terminal, and selects the data and files and so on which need to be encrypted, and it also can choose to start the encryption system when booting, and after the encryption system is started, it authenticates the current user and compares the read unique identity number of the current subscriber identity card with the stored unique identity number of the subscriber identity card, and if they are the same, it controls the terminal to enter into the normal working state, if the two are not the same, the terminal locks itself or disables the access of the current user, or it saves the unique identity numbers of the terminal and the subscriber identity card in the mobile network service server, sending an authentication request to the terminal via the mobile network service server, and when the authentication by the terminal cannot be passed, the terminal locks itself or disables the access of the current user.

The unique identity number of the subscriber identity card in the embodiment of the present document includes but not limited to the following identity numbers: IMSI (International Mobile Subscriber Identifier), ID number, MEID (Mobile Equipment IDentifier) and the ESN (Emergency Service Number).

The First Device Embodiment

Figure 1:
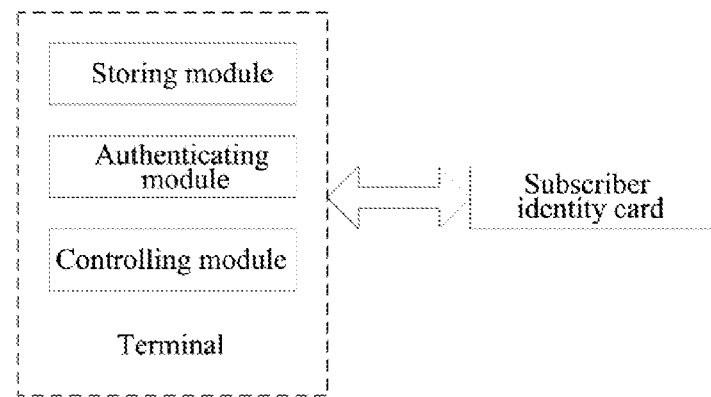
FIG. 1 is a block diagram of a system for encrypting a terminal with a subscriber identity card in accordance with an embodiment of the present document.

According to the embodiment of the present document, the present document provides a system for encrypting a terminal with a subscriber identity card, and the system authenticates the subscriber identity card via the terminal, when the authentication is not passed, the terminal locks itself or disables the access of the user, as shown in FIG. 1, the system comprises:

a storing module, which is configured to store the unique identity number of the subscriber identity card;

an authenticating module, which is configured to detect the operations of the user and authenticate the current user in accordance with the authentication conditions set by the user, wherein said authenticating the current user refers to that the terminal reads the unique identity number of the current subscriber identity card, and compares the read unique identity number of the current subscriber identity card with the unique identity number of the subscriber identity card stored in the storing module; and a controlling module, which is configured to lock the terminal or disable the current user to access the terminal according to the authentication result of the authenticating module.

The abovementioned authentication conditions can be set by the user, that is, setting the conditions to authenticate the subscriber identity card of the current user, and the conditions can be, but not limited to:

the terminal authenticates the current user when detecting the booting operation of the current user, namely when the current user starts up the terminal, the terminal authenticates the subscriber identity card of the current user;

when the current user accesses the encrypted data and/or files and/or folders and/or virtual storage space set by the user, authenticating the current user, after booting normally, the terminal starts to authenticate the current subscriber identity card according to the encrypted data and so on set by the user when the current user accesses the encrypted data; and authenticating the current user according to the authentication time or time interval set by the user. When the authentication time set by the user expires, the subscriber identity card of the current user is authenticated, or the subscriber identity card is cyclically authenticated according to the time interval set by the user.

When the terminal is lost, in order to locate the location information of the terminal, the system may also comprise a location reporting module, which is used to: after the terminal locks itself or disables the access of current user, report the location information of the terminal to the mobile communication network server.

When the terminal is lost, in order to prevent the privacy in the terminal from being watched by other people, a deleting module can also be set in the system, and the deleting module is configured to: after the terminal locks itself or disables the access of current user, delete the encrypted data and/or files and/or folders and/or virtual storage space set by the user.

The Second Device Embodiment

Figure 2:
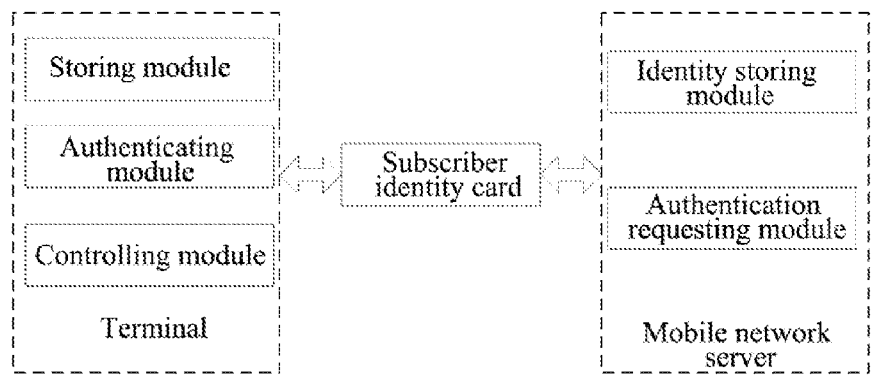
FIG. 2 is a block diagram of another system for encrypting a terminal with a subscriber identity card in accordance with an embodiment of the present document.

According to the embodiment of the present document, the present document provides another system for encrypting a terminal with a subscriber identity card, and the system authenticates the subscriber identity card with the terminal, when the authentication is not passed, the terminal reports it to the mobile network server, and the terminal is reversely locked via the mobile network server, as shown in FIG. 2, the system comprises:

a storing module, which is provided in the terminal and configured to store the unique identity number of the subscriber identity card;

an identity storing module, which is provided in the mobile network server and configured to store the unique identity numbers of the subscriber identity card and terminal;

an authentication requesting module, provided in the mobile network server and configured to send an authentication request to the terminal through the subscriber identity card;

an authenticating module, provided in the terminal and configured to authenticate the current user according to the authentication request sent by the mobile communication network server, comprising: the terminal reads the unique identity number of the current subscriber identity card, and compares the read unique identity number of the current subscriber identity card with the stored unique identity number of the subscriber identity card; and a controlling module, provided in the terminal and configured to lock the terminal or disable the user to access the terminal according to the authentication result of the authenticating module.

When the terminal is lost, in order to locate the location information of the terminal, a location reporting module may also be provided in the terminal and configured to: after the terminal locks itself or disables the access of current user, report the location information of the terminal to the mobile communication network server.

When the terminal is lost, in order to prevent the privacy in the terminal from being watched by other people, a deleting module can also be set in the terminal and is configured to: after the terminal locks itself or disables the access of current user, delete the encrypted data and/or files and/or folders and/or virtual storage space set by the user.

The First Method Embodiment

Figure 3:
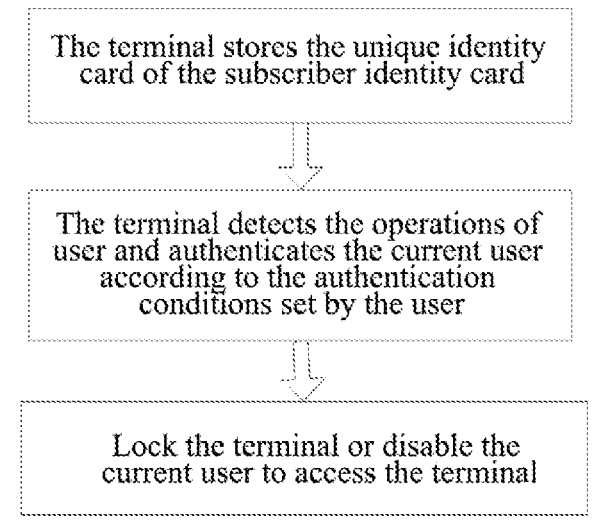
FIG. 3 is a flow chart of a method for encrypting a terminal with a subscriber identity card in accordance with an embodiment of the present document.

The embodiment of the present document discloses a method for encrypting a terminal with a subscriber identity card, and the method authenticates the subscriber identity card with the terminal, when the authentication is not passed, the terminal locks itself or disables the access of user, as shown in FIG. 3, the steps of the method are as follows:

the terminal stores the unique identity number of the subscriber identity card;

the terminal detects the operations of user and authenticates the current user in accordance with the authentication conditions set by the user. Said authenticating the current user refers to that the terminal reads the unique identity number of the current subscriber identity card, and compares the read unique identity number of the current subscriber identity card with the stored unique identity number of the subscriber identity card, if they are the same, the terminal enters into the normal working state, if the two are not the same, then the terminal is locked or the access of current user is disabled;

after the terminal is locked, the location information of the terminal is reported to the mobile communication network server;

the encrypted data and/or files and/or folders and/or virtual storage space set by the user are deleted.

The abovementioned authentication conditions can be set by the user, that is, setting the conditions for authenticating the subscriber identity card of the current user, and the conditions may be, but not limited to:

the terminal authenticates the current user when detecting the booting operation of the current user, namely when the current user starts up the terminal, the terminal authenticates the subscriber identity card of the current user;

when the current user accesses the encrypted data and/or files and/or folders and/or virtual storage space set by the user, the current user is authenticated, and after the terminal starts up normally, the terminal starts to authenticate the current subscriber identity card according to the encrypted data set by the user when the current user accesses the encrypted data; and the current user is authenticated according to the authentication time or time interval set by the user, and when the authentication time set by the user expires, the subscriber identity card of the current user is authenticated, or the subscriber identity card is cyclically authenticated according to the time interval set by the user.

The Second Method Embodiment

Figure 4:
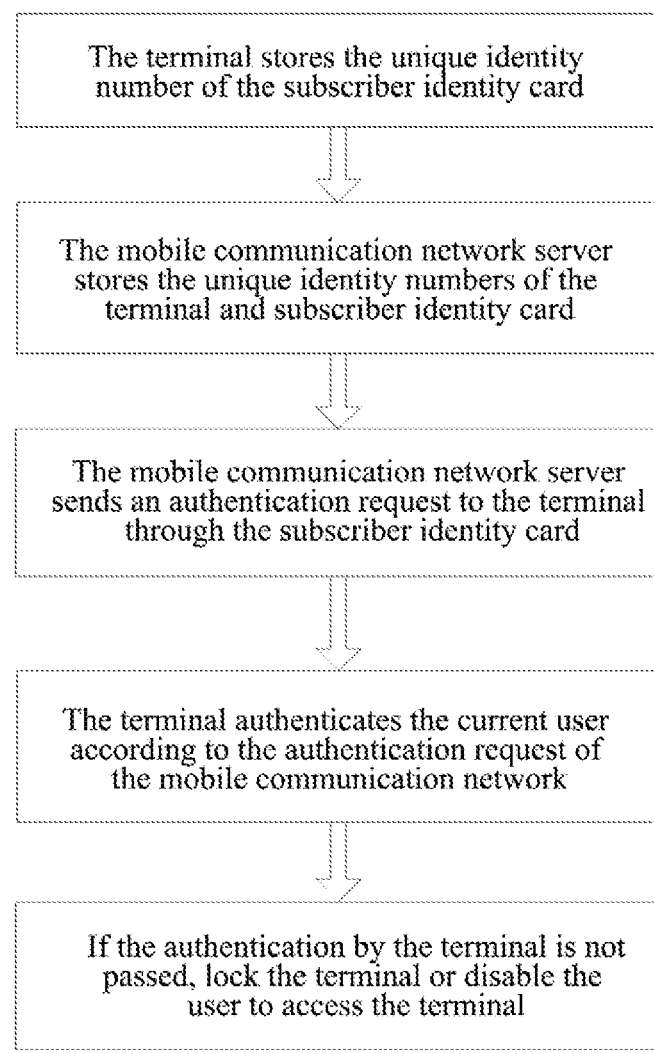
FIG. 4 is a flow chart of another method for encrypting a terminal with a subscriber identity card in accordance with an embodiment of the present document.

The embodiment of the present document discloses another method for encrypting a terminal with a subscriber identity card, and in the method, an authentication request is sent to the terminal through a mobile network server, and when the authentication is not passed, the terminal is locked or the access of user is disabled, as shown in FIG. 4, the steps of the method are as follows:

the terminal stores the unique identity number of the subscriber identity card;

the mobile communication network server stores the unique identity numbers of the terminal and subscriber identity card;

the mobile communication network server sends an authentication request to the terminal through the subscriber identity card; and according to the authentication request sent by the mobile communication network server, the terminal authenticates the current user, and said authenticating the current user refers to that the terminal reads the unique identity number of the current subscriber identity card, and compares the read unique identity number of the current subscriber identity card with the stored unique identity number of the subscriber identity card, if they are the same, the terminal enters into the normal working state, if they not the same, the terminal is locked or the access of user is disabled.

When the terminal is lost, in order to locate the location information of the terminal, a location reporting module can also be set in the terminal and used to: after locking the terminal or disabling the access of user, report the location information of the terminal to the mobile communication network server.

When the terminal is lost, in order to prevent the privacy in the terminal from being watched by other people, a deleting module can also be set in the terminal and used to: after locking the terminal or disabling the access of user, delete the encrypted data and/or files and/or folders and/or virtual storage space set by the user.

When both the subscriber identity card and the terminal are simultaneously lost, the user can use the relevant documents to cancel the subscriber identity card in the Office of the mobile operator services, and apply for a new card so that the authentication of the original subscriber identity card fails and the terminal is reversely locked (include clearing the Private Data).

Finally, it should be noted that: the above description is only preferred embodiments of the present document and not intended to limit the present document, although the present document has been described in detail with reference to the abovementioned embodiments, for a person skilled in the art, modifications can still be made to the technical solutions described in the abovementioned embodiments, or equivalent replacements can be made for some of the technical features. Any modification, equivalent replacement and improvement made within the spirit and principle of the present document should be included within the protection scope of the present document.

INDUSTRIAL APPLICABILITY

Compared with the related art, the method and system provided in the embodiments of the present document use the subscriber identity card to encrypt the mobile terminal, so as to make the terminal encryption technology more secure and reliable, and to improve the user experience

What we claim is:

1. A method for encrypting a terminal with a subscriber identity card, comprising:
the terminal storing a unique identity number of the subscriber identity card; and
the terminal detecting operations of a user, and authenticating the current user when the current user accesses encrypted data and/or files and/or folders and/or virtual storage space set by the user, or when the terminal receives an authentication request sent by a mobile network server via the subscriber identity card;
wherein said authenticating the current user refers to that: the terminal reads a unique identity number of a current subscriber identity card and compares the read unique identity number of the current subscriber identity card with the stored unique identity number of the subscriber identity card, if both are the same, the terminal entering into a normal working state, and if both are different, the terminal locking self or disabling access of the current user.

2. The method of claim 1, further comprising: after the terminal locks self or disables the access of the current user, reporting location information of the terminal to the mobile network server.

3. The method of claim 1, further comprising: after the terminal locks self or disables the access of the current user, deleting encrypted data and/or files and/or folders and/or virtual storage space set by the user.

4. The method of claim 1, further comprising:
the mobile network server storing a unique identity number of the terminal and the unique identity number of the subscriber identity card;
the mobile network server sending to the terminal an authentication request via the subscriber identity card.

5. The method of claim 4, further comprising: after the terminal locks self or disables the access of the current user, reporting location information of the terminal to the mobile network server.

6. The method of claim 4, further comprising: after the terminal locks self or disables the access of the current user, deleting encrypted data and/or files and/or folders and/or virtual storage space set by a user.

7. A system for encrypting a terminal with a subscriber identity card, comprising the terminal and the subscriber identity card, wherein the terminal comprises a processor and a storage device, and wherein the storage device stores processor-executable programs and the programs comprise:
a storing module, configured to store a unique identity number of the subscriber identity card;
an authenticating module, configured to detect operations of a user, as well as authenticate the current user when the current user accesses encrypted data and/or files and/or folders and/or virtual storage space set by the user;
wherein the authenticating module is configured to authenticate the current user through a following way: reading a unique identity number of a current subscriber identity card, and comparing the read unique identity number of the current subscriber identity card with the unique identity number of the subscriber identity card stored in the storing module; and
a controlling module, configured to lock the terminal or disable access of the current user if the read unique identity number of the current subscriber identity card is different from the unique identity number of the subscriber identity card stored in the storing module.

8. The system of claim 7, wherein the programs further comprise a location reporting module, which is provided in the terminal and configured to: after the terminal locks self or disables the access of the current user, report location information of the terminal to a mobile network server.

9. The system of claim 7, wherein the programs further comprise a deleting module, which is provided in the terminal and configured to: after the terminal locks self or disables the access of the current user, delete encrypted data and/or files and/or folders and/or virtual storage space set by the user.

10. A system for encrypting a terminal with a subscriber identity card, comprising the terminal, the subscriber identity card and a mobile network server;
wherein the terminal comprises a processor and a storage device, and wherein the storage device stores processor-executable programs and the programs comprise:
a storing module, configured to store a unique identity number of the subscriber identity card;

an authenticating module, configured to: when receiving an authentication request sent by the mobile network server via the subscriber identity card, authenticate a current user according to the authentication request in a following way: reading a unique identity number of a current subscriber identity card, and comparing the read unique identity number of the current subscriber identity card with the unique identity number of the subscriber identity card stored in the storing module; and a controlling module, configured to lock the terminal or disable access of the current user if the read unique identity number of the current subscriber identity card is different from the unique identity number of the subscriber identity card stored in the storing module; and wherein the mobile network server comprises a processor and a storage device, and wherein the storage device stores processor-executable programs and the programs comprise:

an identity storing module, configured to store the unique identity number of the subscriber identity card and a unique identity number of the terminal;

an authentication requesting module, configured to send an authentication request to the terminal through the subscriber identity card.

11. The system of claim 10, wherein the programs of the terminal further comprise a location reporting module, which is provided in the terminal and configured to: after the terminal is locked or access of the current user is disabled, report location information of the terminal to the mobile network server.

12. The system of claim 10, wherein the programs of the terminal further comprise a deleting module, which is provided in the terminal and configured to: after the terminal is locked or access of the current user is disabled, delete encrypted data and/or files and/or folders and/or virtual storage space set by the user.

\* \* \* \* \*